United States Patent
Plotkin

(10) Patent No.: US 7,620,555 B1
(45) Date of Patent: Nov. 17, 2009

(54) PROCESS FOR COMPUTER IMPLEMENTED MANUSCRIPT REVIEW

(75) Inventor: Joel Fredric Plotkin, Bethesda, MD (US)

(73) Assignee: Precision Computer Works, Inc., Bethesda, MD (US)

( * ) Notice: Subject to any disclaimer, the term of this patent is extended or adjusted under 35 U.S.C. 154(b) by 1457 days.

(21) Appl. No.: 09/513,960

(22) Filed: Feb. 28, 2000

(51) Int. Cl.
*G06Q 10/00* (2006.01)
*G06F 170/30* (2006.01)

(52) U.S. Cl. .............................................. 705/1; 707/9
(58) Field of Classification Search ...................... 705/1, 705/51; 707/9, 104.1; 713/182–185; 380/201
See application file for complete search history.

(56) References Cited

U.S. PATENT DOCUMENTS

| | | | | |
|---|---|---|---|---|
| 5,317,683 A | * | 5/1994 | Hager et al. | 705/9 |
| 5,349,648 A | * | 9/1994 | Handley | 707/530 |
| 5,377,355 A | * | 12/1994 | Hager et al. | 707/511 |
| 6,088,702 A | * | 7/2000 | Plantz et al. | 707/10 |
| 6,314,408 B1 | * | 11/2001 | Salas et al. | 705/54 |
| 6,314,425 B1 | * | 11/2001 | Serbinis et al. | 707/10 |

OTHER PUBLICATIONS

Price et al. Peering Into Peer Review; The HW Wilson Co., pp. 1 and 2. Nov. 1995.*
Cantekin et al. Biomedical Information, Peer Review, and Conflict of Interest as They Influence Public Health, The Journal of the American Medical Association, v263, n10, p. 1427(4), 1990.*
Scherr Times Change and so Does the jsbm: An Editorial, Journal of Small Business Management, v35 n1, pp. 1, 1997.*

* cited by examiner

*Primary Examiner*—Igor N Borissov
(74) *Attorney, Agent, or Firm*—Neifeld IP Law, PC

(57) ABSTRACT

A computer implemented process of reviewing a manuscript and determining whether to print the manuscript into a publication substantially reduces the time and cost for authors to deliver the manuscript to journals and publishers. The process also reduces the personnel effort required to process and approve a manuscript on the publisher side. Furthermore, the computer implemented process can timely and accurately track information related to the determination process and the final decision over the manuscript back to the author. As a result, a more efficient and effective manuscript review process can be achieved.

27 Claims, 2 Drawing Sheets

A schematic block diagram of one possible embodiment of the manuscript approval system.

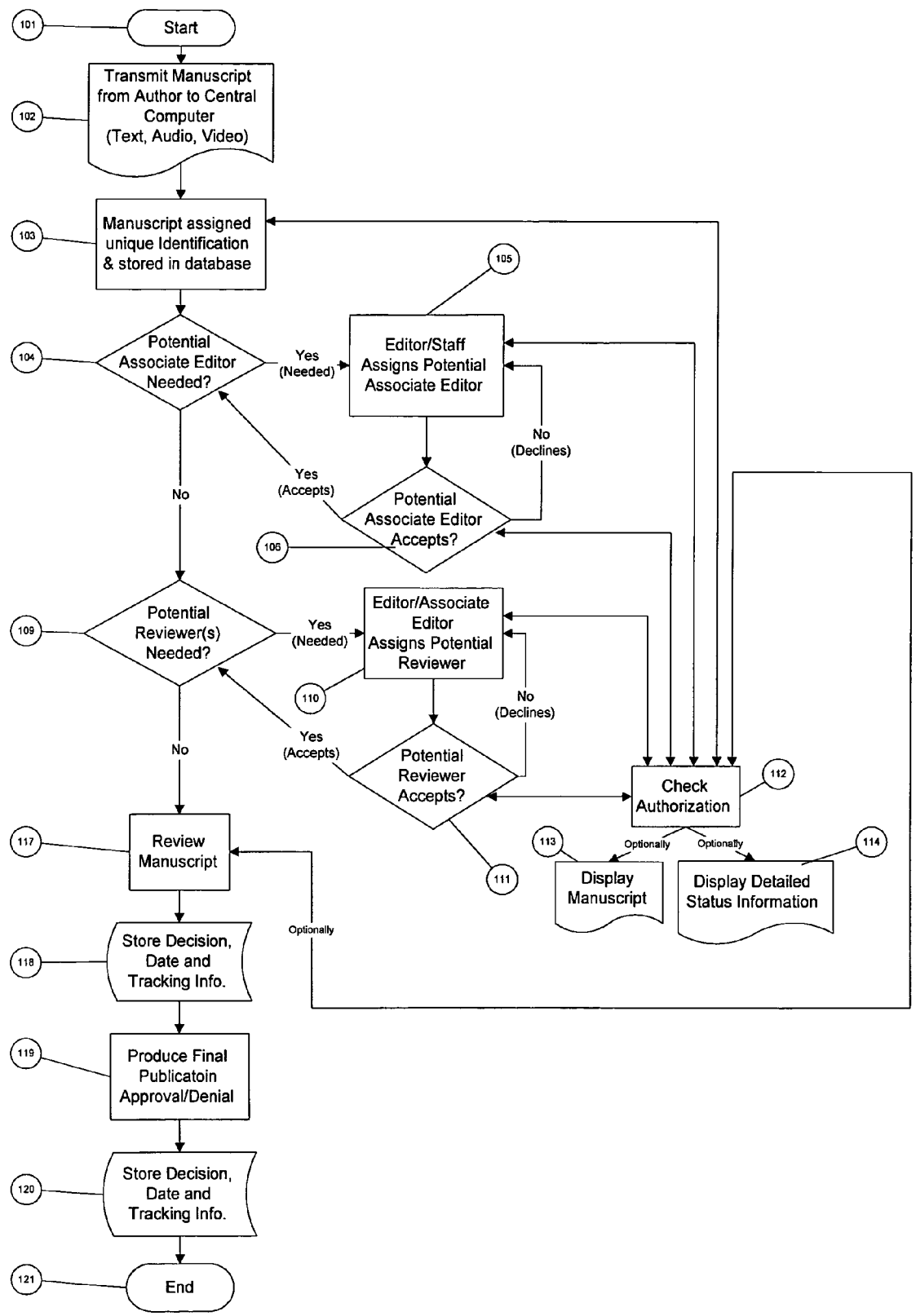
Figure 1: A flow chart of operations of one possible embodiment of the method.

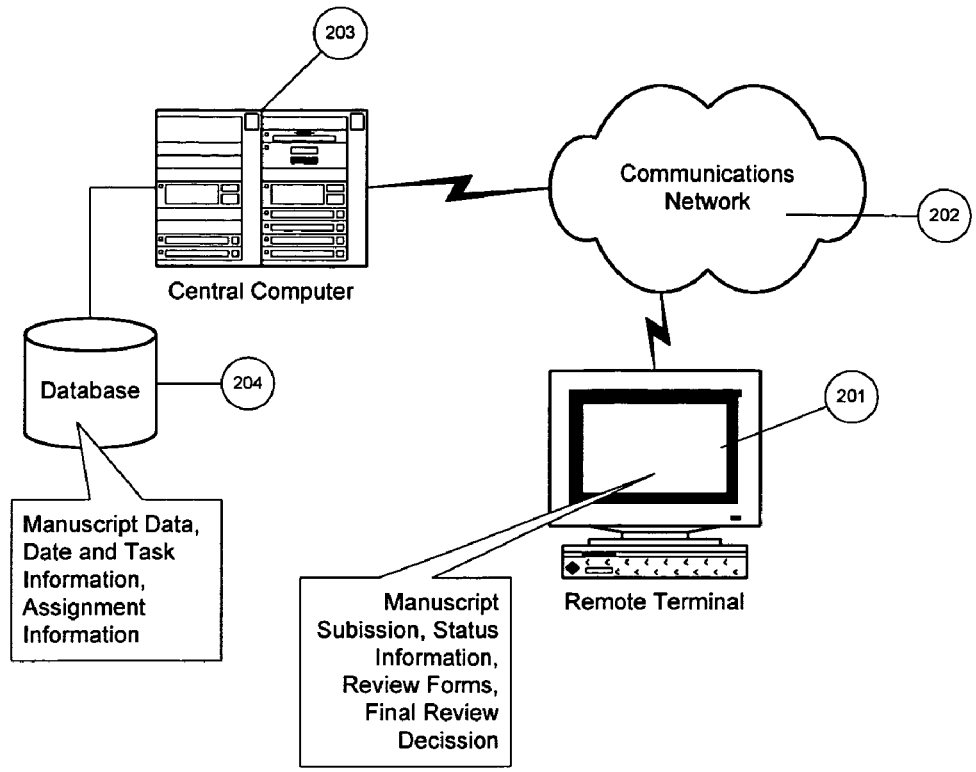
Figure 2: A schematic block diagram of one possible embodiment of the manuscript approval system.

PROCESS FOR COMPUTER IMPLEMENTED MANUSCRIPT REVIEW

BACKGROUND OF THE INVENTION

This invention relates generally to the field of manuscript publishing, and more particularly to a process for computer implemented manuscript review.

The traditional paper based manuscript review process has been around for over a hundred years. The primary goal of the process is to determine if a manuscript is suitable for inclusion in a journal.

The basic steps of the traditional process include the delivery of the paper manuscript to one or more people for review, and the subsequent delivery of their review (decision) back to the author and the journal. Since the traditional process includes several steps, each of which requires manual effort (preparing the paper documents, logging when each steps starts and completes, etc.), and the delivery of documents between parties, it is relatively slow and antiquated.

SUMMARY OF THE INVENTION

The primary object of the invention is to provide a method to reduce the time and cost it takes for authors to deliver a manuscript to journals and publishers.

Another object of the invention is to provide a method to reduce the time and cost it takes journals and publishers to process and approve a manuscript.

A further object of the invention is to provide a method to reduce the effort and personnel required to process and approve a manuscript.

Yet another object of the invention is to provide automatic and accurate manuscript tracking information.

Still yet another object of the invention is to provide more timely and accurate tracking information from journals and publishers back to the authors.

Other objects and advantages of the present invention will become apparent from the following descriptions, taken in connection with the accompanying drawings, wherein, by way of illustration and example, an embodiment of the present invention is disclosed.

A computer implemented manuscript review process comprising the steps of: receiving data defining the manuscript at centralized computer, determining one or more potential reviewers to review the manuscript, electronically and securely transmitting the data defining the manuscript to the determined potential reviewer(s), if the reviewer reviews the manuscript, storing the reviewer's review, and storing event tracking information including dates upon which the data defining the manuscript, was received at the central computer, was transmitted to reviewers and editors, dates upon which the data defining reviews were received at the central computer, dates upon which editor responses regarding the manuscript were logged, and identity information identifying the reviewers, editors, and authors. Electronically receiving and transmitting the manuscript provides advantages over the traditional paper based method including additional security, automated logging of events, automated determination of reviewers, and reduced delays inherent in conventional transmission mechanisms, such as mail.

The drawings constitute a part of this specification and include exemplary embodiments of the invention, which may be embodied in various computer implemented forms. It is to be understood that in some instances various aspects of the invention may be shown exaggerated or enlarged to facilitate an understanding of the invention.

BRIEF DESCRIPTION OF THE DRAWINGS

FIG. 1 is a flow chart showing novel operations of an embodiment of the invention; and FIG. 2 is a schematic block diagram of the novel manuscript approval system of the embodiment of FIG. 1.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The invention is a computer implemented process for manuscript review. A "manuscript" is a set of data comprised of at least one of the following: text data, audio data, and video data. Before the manuscript can be published (either in print, electronically, or in some other form), the publishing organization requires that the manuscript meet a certain set of criteria and/or quality level as determined by one or more reviewers. "Manuscript review" embodies the steps involved in approving or denying the manuscript for publication based at least in part upon reviews provided by reviewers.

FIG. 2 shows a centralized computer 203. The embodiment of the computer implemented manuscript review entails using the centralized computer 203 in communication with a distributed computer network 202 having remote terminals 201. An author can use the remote terminals 201 to transmit the manuscript via the terminal 201 and network 202 to the centralized computer 203 via the distributed computer network 202 where it is stored into a database 204. The remote terminal 201 preferably is a personal computer running Web browser software. The distributed computer network 202 preferably is the Internet. The centralized computer 203 preferably is a Web server running Web server software. The centralized database 204 may be a commercial software package, such as any version of Access, SQL Server, Sybase, or Oracle. Custom software could be used to augment the Web server and database software to read and write information to the database and compose, send, and receive HTML Web forms and screens to the remote terminals to implement the process.

After the data defining the manuscript is transmitted 102 from the author to the central computer, the publishing organization can then retrieve the electronic representation 112, 113 of the manuscript and assign it for review to one or more reviewers, 109, 110, 111. The publishing organization can, optionally, assign an editor, monitoring editor, or associate editor to oversee the review process 104, 105, 106, and make the final publishing approval decision. The terms "monitoring editor" or "associate editor" are used synonymously in this specification. A monitoring or associate editor normally reports to an editor of the publication. Reviewers report either directly or indirectly to the monitoring/associate editor or editor of the publication. "Potential" monitoring editor refers to a monitoring editor assigned to a manuscript that has not yet accepted or rejected the assignment. "Potential" reviewer refers to a reviewer assigned to a manuscript who has not yet accepted or rejected the review assignment. The embodiment of the invention displays unassigned manuscripts to the editor (or the editorial staff) of the publication via one of the remote terminals, and the editor (or staff) then assign one or more of the following: monitoring editor 104,105,106, associate editor 104,105,106, and/or reviewers 109,110, 110. This assignment could be facilitated by a set of computerized lists and forms. Another embodiment of this specific step entails automating the assignment processes so that no human intervention is required. Unassigned manuscripts could be sequentially or randomly assigned to a pool of monitoring editors and/or reviewers depending on who has free time or has performed the least amount of work, etc. The terms "free time" and "least amount of work" refer to determinations based upon tracking information stored in association with an identification of each editor and reviewer in the database 204.

During and after a manuscript is assigned, the editor, monitoring editor, and/or reviewers need to receive and view the manuscript in a secure method 112, 114. The central computer 203, database 204, distributed network 202, and remote terminals 201 preferably are used with one another to provide the secure means of delivering the manuscript to the authorized individual(s). Authorization preferably is generates based on a set of tokens in possession of the individual who wants to view the manuscript. The tokens including one or more of the following: user's name, user's password, manuscript identification tag or number, and role assigned to the user for that manuscript (e.g., reviewer, editor, or author). The user would transmit a set of these tokens from a remote terminal 201 across the communications network 202 to the central computer 203 to be validated by data residing in the database 204. The manuscript data could then be retrieved from the database 204 and sent over the communications network 202 by the central computer 203 to the user operating the remote terminal 201. This is inherently more secure than the traditional manuscript delivery processes such as mail or fax where the manuscript could be view by non-authorized intermediary individuals.

A user's "role" includes one or more of the following relationships between the manuscript and the associated person: author, editor, associate editor, reviewer, or staff member. Associated with each role is a set of tasks that make up the computer implemented manuscript review. One embodiment of these roles/tasks associations include: an author can submit 102, view 112,113, and get status information for a manuscript 112,114; an editor can assign monitoring editor(s) 104, 105,106, assign reviewer(s) 109,110,111, view 112,113, approve/deny for publication 119 and get status information for a manuscript 112,114; an associate editor can assign reviewer(s) 108,110,111, view 112,113, approve or deny for publication 119 and get status information for a manuscript 112,114; a reviewer can view 112,113, approve or deny for publication 117,118 and get status information for a manuscript 112,114. Each of the tasks can be performed at a remote terminal 201 via a distributed communications network 202 attached to the central computer 203 which stores the manuscript and event tracking information into the database 204.

One embodiment of event tracking information includes the date, time, manuscript identification, person identification, and task description. A report can be compiled by the central computer 203 using the data residing in the database 204 and displayed on the remote terminals 201 to convey important status information about the manuscript, person, and/or tasks, such as whether reviewers reviews have been received in a predetermined time period, editors inputs have been logged in a predetermined time period, whether a set of anticipated events, such as receipt of a number of reviewers reviews and editors actions occurred in a predetermined time period. Automatic messages may be sent over the communications network 202 (via e-mail) in response to status information. For example, a message may be sent upon a status check that determines that a reviewer has not transmitted to the central computer a review in a predetermined time period.

After a reviewer or monitoring editor has viewed a manuscript, they can use the remote terminal 201 attached to the distributed communications network 202, attached to the central computer 203 and database 204 to store their publication approval or denial decision 118. One embodiment of the system has the remote terminal display a form 117 where the reviewer can enter a decision and additional comments for subsequent storage 118 into the database 204 located on the central computer 203.

After all of the reviewers have supplied their publication approval/denial decision to the central computer, the editor (or delegated associate editor or staff member) can then correlate the publication decisions 119 about the specific manuscript and store a final publication approval/denial decision 120. Authorized users (the author) can later retrieve this decision, as they desire via the remote terminals 201. Alternatively, the decision to publish may be automated based upon a ranking of the review decisions received from the reviewers. For example, a simple majority tallying of the individual reviews associated with a manuscript can make the final publication approval/denial decision 119. Any manuscript with a positive percentage of reviews (the actual percentage level set by the editor or publication staff) could automatically be accepted for publication while the rest were rejected for publication. For another example, if all reviewers indicate the manuscript should be published, the system might automatically indicate that the manuscript has been approved for publishing, store the decision 120, and send the manuscript to a printing queue or printing facility.

Optionally, the author of any manuscript denied for publication or "rejected" could be sent a notification via the distributed communications network and remote terminals of the rejection, and offered another attempt for approval upon making general or specific changes to the manuscript suggested by the reviewers.

By using a central computer, distributed communications network, and remote terminals a computer implemented manuscript review is more efficient then existing manuscript review methods. The described embodiment reduces time to deliver the manuscript between parties, provides a more secure manor of delivering the manuscript, and provides for a means of tracking detailed events and tasks which have occurred relating to the manuscript. Additionally, the tasks, which need to be accomplished for manuscript review, can be orchestrated by using the event/task information stored in the database on the central computer. This orchestration of tasks can be done with reduced human intervention, thus reducing human errors, manpower requirements, increasing accuracy, and reducing overall time and costs to accomplish the manuscript review.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A computer implemented manuscript review and determination process, comprising:

receiving at a central computer system, said computer system comprising a computer and a memory, manuscript data from a remote terminal associated with an author, said manuscript data defining a complete manuscript including at least one of text data, audio data, and video data;

generating by said central computer system a request to review prompt for prompting a potential reviewer for agreement to review said manuscript;

transmitting said request to review prompt to a remote terminal associated with said potential reviewer;

storing in a database controlled by said central computer system agreement data received from said potential reviewer at said central computer system, said agreement data including at least one of agreement to review and disagreement to review said manuscript; and storing a decision whether to publish said manuscript;

further comprising storing at said central computer system different rights relating to a manuscript for users defined as author, editor, associate editor, and reviewer;

further comprising configuring said central computer system so that a user defined as an author of said manuscript has rights to get status information relating to said manuscript, a user defined as an editor has rights to assign associate editors to said manuscript, assign reviewers to said manuscript, view, authorize publication, and get status information for said manuscript, a user defined as an associate editor for said manuscript has rights to assign reviewers to said manuscript, view, authorize publication, and get status information for said manuscript and does not have rights to assign additional associate editors to said manuscript, a user defined as a reviewer of a manuscript has rights to indicate whether said manuscript should be published, and get status information on said manuscript.

2. The computer implemented method according to claim 1, further comprising:

receiving, at said central computer system agreement data indicating that said potential reviewer, declines to review said first manuscript; and transmitting, automatically in response to receipt of said agreement data indicating that said potential reviewer declines to review said manuscript, from said central computer system, over an electronic communications network, to an address associated with another user, a signal prompting said another user to review said manuscript.

3. The computer implemented method according to claim 1, further comprising said central computer system storing at least one date on which either a reviewer is assigned and change in status data for said manuscript.

4. The computer implemented method according to claim 1, further comprising said central computer system storing a date on which said central computer system at least one of receives said manuscript, prompts a reviewer, and receives agreement data to review said manuscript.

5. The computer implemented method according to claim 1, further comprising one of said reviewer and said associate editor viewing said manuscript on a monitor of a remote terminal.

6. The computer implemented method according to claim 1, further comprising said reviewer transmitting from a remote terminal via an electronic communications network to said central computer system a recommendation whether to publish said manuscript.

7. The computer implemented method according to claim 1, further comprising said associated editor transmitting from a remote terminal via an electronic communications network to said central computer system a decision to publish said manuscript.

8. The computer implemented method according to claim 1, further comprising said editor transmitting from a remote terminal via an electronic communications network to said central computer system a final decision whether to publish said manuscript.

9. The computer implemented method according to claim 1, wherein said central computer system is programmed with Web server software such that it responds to prompts transmitted to it from users using Web browsers.

10. The computer implemented method according to claim 1, wherein said central computer system comprises a relational database program.

11. The computer implemented method according to claim 1, wherein said database is in a format useable by a version of Access, SQL Server, Sybase, and Oracle.

12. The method of claim 1 further comprising:
configuring said central computer system so that:
a user defined as an author has rights to submit and view said manuscript; and
a user defined as an associate editor of said manuscript has right to deny publication of said manuscript.

13. The method of claim 1 further comprising:
configuring said central computer system so that:
a user defined as an associate editor of said manuscript has no right to associate with another user roll of associate editor of said manuscript;
a user defined as reviewer of said manuscript has no right to associate any roll with any other user;
a user defined as said author of said manuscript has no right to associate any role with any other user; and
a user defined as said associate editor of said manuscript has no right to associate with another user roll of editor of said manuscript.

14. A system for performing a computer implemented manuscript review and determination process, said system comprising:

a central computer system comprising:
a central processing unit; and
memory,
wherein said central computer system is configured for:
receiving manuscript data from a remote terminal associated with an author, said manuscript data defining a complete manuscript including at least one of text data, audio data, and video data;
generating a request to review prompt for prompting a potential reviewer for agreement to review said manuscript;
transmitting said request to review prompt to a remote terminal associated with said potential reviewer;
storing in a database in said memory agreement data received by said central computer system said potential reviewer, said agreement data including at least one of agreement to review and disagreement to review said manuscript;
storing a decision whether to publish said manuscript; and
storing different rights relating to a manuscript for users defined as author, editor, associate editor, and reviewer, so that:
a user defined as an author of said manuscript has rights to get status information relating to said manuscript;
a user defined as an editor has rights to assign associate editors to said manuscript, assign reviewers to said manuscript, view, authorize publication, and get status information for said manuscript;

a user defined as an associate editor for said manuscript has rights to assign reviewers to said manuscript, view, authorize publication, and get status information for said manuscript and does not have rights to assign additional associate editors to said manuscript; and a user defined as a reviewer of a manuscript has rights to indicate whether said manuscript should be published, and get status information on said manuscript.

15. The system of claim 14, wherein said central computer system is further configured for:

receiving agreement data indicating that said potential reviewer declines to review said manuscript; and transmitting, automatically in response to receipt of said agreement data indicating that said potential reviewer declines to review said manuscript, over an electronic communications network, to an address associated with another user, a signal prompting said another user to review said manuscript.

16. The system of claim 14, wherein said central computer system is further configured for:

storing at least one date on which either a reviewer is assigned and change in status data for said manuscript.

17. The system of claim 14, wherein said central computer system is further configured for:

storing a date on which said central computer system at least one of receives said manuscript, prompts a reviewer, and receives agreement data to review said manuscript.

18. The system of claim 14, further comprising:

at least one of a monitor or a remote terminal on which one of said reviewer and said associate editor can view said manuscript.

19. The system of claim 14, further comprising:

a remote terminal from which said reviewer can transmit via an electronic communications network to said central computer system a recommendation whether to publish said manuscript.

20. The system of claim 14, further comprising:

a remote terminal from which said associate editor can transmit via an electronic communications network to said central computer system a decision to publish said manuscript.

21. The system of claim 14 further comprising:

a remote terminal from which said editor can transmit via an electronic communications network to said central computer system a final decision whether to publish said manuscript.

22. The system of claim 14, wherein said central computer system is programmed with Web server software such that it responds to prompts transmitted to it from users using Web browsers.

23. The system of claim 14, wherein said central computer system comprises a relational database program.

24. The system of claim 14, wherein said database is in a format useable by a version of Access, SQL Server, Sybase, and Oracle.

25. The method of claim 14, wherein said central computer system is configured so that:

a user defined as an author has rights to submit and view said manuscript; and a user defined as an associate editor of said manuscript has right to deny publication of said manuscript.

26. The method of claim 14, wherein said central computer system is configured so that:

a user defined as an associate editor of said manuscript has no right to associate with another user roll of associate editor of said manuscript;

a user defined as reviewer of said manuscript has no right to associate any roll with any other user;

a user defined as said author of said manuscript has no right to associate any role with any other user; and a user defined as said associate editor of said manuscript has no right to associate with another user roll of editor of said manuscript.

27. A computer readable medium comprising computer readable instructions embedded therein which, when executed by a central computer system, said system comprising a central processing unit and a memory, causing said central computer system to perform a method for manuscript review, comprising:

receiving at said central computer manuscript data from a remote terminal associated with an author, said manuscript data defining a complete manuscript including at least one of text data, audio data, and video data;

generating at said central computer system a request to review prompt for prompting a potential reviewer for agreement to review said manuscript;

transmitting said request to review prompt to a remote terminal associated with said potential reviewer;

storing in a database controlled by said central computer system agreement data received from said potential reviewer at said central computer system, said agreement data including at least one of agreement to review and disagreement to review said manuscript; and storing a decision whether to publish said manuscript;

further comprising storing at said central computer system different rights relating to a manuscript for users defined as author, editor, associate editor, and reviewer;

further comprising configuring said central computer system so that:

a user defined as an author of said manuscript has rights to get status information relating to said manuscript;

a user defined as an editor has rights to assign associate editors to said manuscript, assign reviewers to said manuscript, view, authorize publication, and get status information for said manuscript;

a user defined as an associate editor for said manuscript has rights to assign reviewers to said manuscript, view, authorize publication, and get status information for said manuscript and does not have rights to assign additional associate editors to said manuscript; and a user defined as a reviewer of a manuscript has rights to indicate whether said manuscript should be published, and get status information on said manuscript.

* * * * *